United States Patent [19]

Merriam et al.

[11] 4,389,335

[45] Jun. 21, 1983

[54] CATALYST FOR CARBON MONOXIDE CONVERSION IN SOUR GAS

[75] Inventors: Jay S. Merriam, LaGrange; Cecil B. Hogg, Louisville, both of Ky.

[73] Assignee: United Catalysts Inc., Louisville, Ky.

[21] Appl. No.: 253,941

[22] Filed: Apr. 14, 1981

[51] Int. Cl.$^3$ .................. B01J 23/34; B01J 23/88
[52] U.S. Cl. .................. 252/439; 252/465; 423/656
[58] Field of Search ............ 252/465, 439; 423/656

[56] References Cited

U.S. PATENT DOCUMENTS 1,330,772  2/1920  Bosch et al. ............... 423/656
3,529,935  9/1970  Lorenz et al. ............ 252/465 X
3,850,841  11/1974  Aldridge et al. ......... 252/439 X
4,153,580  5/1979  Hauberger et al. ........... 252/462

Primary Examiner—W. J. Shine
Attorney, Agent, or Firm—W. R. Price

[57] ABSTRACT

A process is disclosed for the conversion of carbon monoxide in sour synthesis gas mixtures in the presence of a catalyst which is active in the presence of sulfur compounds. The catalyst comprises known sulfactive metal oxides or sulfides supported on a shaped carrier. The catalytically active oxides or sulfides are doubly promoted with an alkali metal compound and an oxide or sulfide or manganese. The two promoters combined in proper ratio provide a synergistic effect on the activity of the catalyst which is enhanced beyond that of the singly promoted catalyst. The catalysts are active at relatively low temperatures of less than 500° F., even in the presence of sulfur compounds. The equilibrium for the conversion of steam and carbon monoxide to hydrogen and $CO_2$ is favored at lower temperatures.

10 Claims, No Drawings

CATALYST FOR CARBON MONOXIDE CONVERSION IN SOUR GAS

FIELD OF THE INVENTION

This invention relates to the production of hydrogen by the reaction of steam with carbon monoxide in the presence of a catalyst. More specifically, this invention relates to the production of hydrogen and the conversion of carbon monoxide in sour gas streams, i.e., in synthesis gas mixtures containing sulfur-bearing impurities.

BACKGROUND OF THE INVENTION

The carbon monoxide reaction with steam has been known for many years as a method for producing hydrogen and carbon dioxide. Many catalytic materials have been proposed for use in the conversion of carbon monoxide with steam more commonly known as the water-gas shift process.

DESCRIPTION OF THE PRIOR ART

U.S. Pat. No. 417,068 disclosed that hydrogen could be obtained by passing carbon monoxide and steam over nickel or metallic cobalt spread on a refractory porous material such as pumice stone. Bosch and Wild, in U.S. Pat. No. 1,113,097, proposed that the cobalt constituent be supported on a refractory porous material. Larson, in 1932, proposed in U.S. Pat. No. 1,889,672; a catalyst comprising copper and various (group VI) metal oxides. U.S. Pat. No. 1,797,426, disclosed a reduced copper oxide-zinc oxide (CuO-ZnO) catalyst for the carbon monoxide conversion reaction to be used at reaction temperatures of 570° F. or higher. Nevertheless, industrial practice resolved itself to the use of an iron oxide-chromium oxide catalyst at reaction temperatures of 750° F. to 850° F. or higher, even though thermodynamic equilibrium favors higher conversion of carbon monoxide at lower temperatures. It was not until the proposal by Edward K. Dienes in U.S. Pat. No. 3,303,001 of a low temperature zinc oxide-copper oxide catalyst, active at temperatures of 500° F. or lower, that the art fully appreciated that the process could be carried out at a low temperature to equilibrium conversion. Unfortunately, the Dienes catalyst does not tolerate even traces of sulfur in the gas feed.

Since gases derived from coal or heavy hydrocarbon feeds suitable for the conversion of carbon monoxide to hydrogen contain appreciable amounts of sulfur, these feeds are precluded from use with the copper-zinc oxide catalyst and are limited for use over the high temperature iron oxide-chromium oxide catalyst. One approach to the problem of increasing conversion, as disclosed by Finneran, Jr., in U.S. Pat. No. 3,345,136, is to utilize a two-stage sour gas conversion process wherein the first stage is at high temperature over a high temperature shift catalyst. Thereafter, this gas is cooled to about 430° F. to 530° F. and the sulfur is removed by adsorption with a zinc oxide adsorbent and fed through a second catalytic converter utilizing a low temperature shift catalyst of the Dienes type at temperatures in the range of 400° F. to 550° F. Another approach has been for the use of sulfactive catalyst comprising cobalt and the oxides and sulfides of molybdenum supported on relatively high surface area carriers. See, for example, British Pat. No. 940,960, U.S. Pat. No. 3,392,001 and U.S. Pat. No. 3,529,935, all of which have been assigned to Badische, Anilin & Soda-Fabrik A.G. (BASF). Aldridge, et. al., of Esso Research and Engineering Company have proposed in a series of patents, namely U.S. Pat. Nos. 3,539,297; 3,615,216; 3,755,566; 3,850,840; and 3,850,841, as well as 3,974,096, that an alkali metal catalyst derived from an acid with ionization constant of less than $1 \times 10^{-3}$ can be used as a promoter in the CO conversion process. Note, for example, particularly U.S. Pat. Nos. 3,850,841 and 3,850,840. Hausberger and Dienes have found that the addition of a rare earth oxide of the lanthanum series to a high surface area alumina carrier for the sulfactive metal oxides tends to stabilize the alumina carrier and inhibit the phase change from gamma alumina to alpha alumina and intermediate phases therebetween (see U.S. Pat. Nos. 4,153,580 and 4,233,180).

SUMMARY OF THE INVENTION

According to this invention, the addition of an alkali metal compound and a small percentage of manganese dioxide to the known sulfactive metal oxide catalyst constituents for the carbon monoxide shift reaction produces a synergistic effect on catalyst activity. Thus, for example, while it is known to add potassium carbonate to promote the activity of a cobalt oxide and molybdenum oxide catalyst supported on an aluminous or spinel carrier, the addition of as little as one-tenth of one percent of manganese to the catalyst produces a 50 to 100% increase in the catalyst's activity. We have also found that the doubly promoted sulfactive carbon monoxide conversion catalysts achieve a surprisingly high activity at relatively low temperatures at which the equilibrium of steam and carbon monoxide to carbon dioxide and hydrogen is favored.

DESCRIPTION OF THE PREFERRED EMBODIMENT

As previously indicated, prior workers have identified the sulfactive metallic oxide and metallic sulfide constituents which can be used in sour gas (i.e. synthesis gas streams containing sulfur compounds) conversion of carbon monoxide to carbon dioxide and hydrogen. Thus, Reitz and Lorenz have, early on, identified the catalyst mixtures of sulfides or oxides of the transition elements listed in groups Va and VIIa of the periodic system as hereinafter defined as a sulfide of cobalt or nickel either alone or on carriers. The term "transition element" listed in the groups Va, VIa and VIIa of the periodic system as used in the specification refers to the periodic system prepared and published by the Radio Corporation of America, includes the elements of vanadium, niobium, tantalum, chromium, molybdenum, tungsten, uranium, manganese and rhenium. As a matter of commercial practice, however, the catalytic constituents have reasonably well defined themselves as oxides or sulfides of cobalt, nickel or molybdenum.

Further, the prior art workers have found that certain carriers have a rather profound effect upon the activity of the catalyst in the conversion of carbon monoxide to carbon dioxide in gas streams containing sulfur compounds. Thus, Lorenz and others have found that zinc aluminate spinels and magnesium aluminate spinels produce a definite effect upon the activity of the sulfactive catalyst which again they identify as the sulfides of transition elements of Group VI of the periodic system admixed with cobalt or nickel. Additionally, many investigators have reported the promotional effect of alkali metal compounds in these reactions. Thus, for example, Aldridge, et. al., of Esso Research and Development set forth in U.S. Pat. Nos. 3,850,840 and 3,850,841, the promotional effect of an alkali metal compound derived from an acid having an ionization constant less than $1 \times 10^{-3}$ in conjunction with the known sulfactive oxides and sulfides previously set forth. However, insofar as we are aware, no one has so far demonstrated the synergistic promotional effect of a small amount of an oxide of manganese dioxide or sulfide to the alkali promoted sulfactive catalyst. Our researches have shown that even at temperatures as low as 450° F., that manganese dioxide or sulfide and potassium carbonate impregnated onto the conventional cobalt oxide and molybdenum oxide catalyst on spinel or gamma alumina carriers enhances the activity of the catalyst by a factor of 1.5 to 2 times. Additionally, the B.E.T. surface area of the catalytic carrier and the total catalyst seems to have very little influence on the activity of the catalyst. Thus, for example, some of the spinel carriers had initial surface areas of less than 100 m²/gm and surface areas after use of as low as 5 to 6 m²/gm. On the other hand, the stabilized alumina catalyst in which the gamma aluminum oxide was stabilized by the addition of small amounts of rare earth metal oxides (as disclosed in the Dienes and Hausberger U.S. Pat. Nos. 4,153,580 and 4,233,180) had initial surface areas in the neighborhood of 125 to 150 m²/gm with very little loss of surface area after use. In some of the cases, the alumina had relatively high surface area identified as the gamma phase. In other instances, the alumina was in the alpha phase and in some instances the x-ray diffraction showed both alpha and gamma phases in the catalyst.

The addition of manganese dioxide to the carrier without the alkali metal compound had little effect on the activity of the catalyst. Alkali metal in the form of potassium carbonate added to the catalyst had a substantial effect, as had previously been reported. Further, the spinel carriers served to enhance the activity of the sulfactive catalyst. However, the activity of the sulfactive catalytic constituents supported on the spinel carriers and alumina carriers were considerably improved and comparable to each other when doubly promoted with the potassium carbonate and manganese oxide or sulfide constituents. This was particularly true at low temperatures.

The composition of the catalyst can vary through a limited range. The oxide or sulfide of cobalt should be present in a weight concentration of from at least 2% to about 10%. Molybdenum oxide or molybdenum sulfide should be present in a concentration by weight of from about 5% to 20%. The alkali metal compound is preferably present in the form of potassium carbonate. The carrier material may be aluminum oxide in the gamma form or in the alpha form, or may be present in the form of a spinel, such as a zinc-aluminate spinel or a magnesium-aluminate spinel. The spinel constituent may be present in a concentration by weight in the range of from about 5% to about 95% of the total of the aluminous carrier. The manganese constituent, on the other hand, is effective in weight concentrations of as low as 0.1%, but preferably is available in concentrations by weight of between 0.1% and 5%.

EXAMPLE 1

This catalyst is a cobalt molybdate on magnesium alumnate extrusions. The ⅛″ extrusions had the following composition.

| Constituent | % |
| --- | --- |
| CoO | 2.99 |
| MoO₃ | 10.9 |
| MgAl₂O₄ | Balance |

EXAMPLE 2

Twenty-five pounds of hydrated alumina were placed into a blender along with 53 grams of spray-dried silica. To this were added slowly 362 grams of high lanthanum rare earth nitrate solution dissolved in 30 pounds of deionized water. The entire mixture was blended until homogeneous. The homogeneous mixture was dried at 300° F. to a level of 25 percent loss on ignition. The dried material was granulated and mixed with 3 percent of aluminum stearate. The mixture was tableted and thereafter calcined at 1250° F. These tablets were immersed in an aqueous cobalt-molybdenum ammine solution, dried, and calcined again at 900° F. The finished catalyst contained by analysis:

| Constituent | % |
| --- | --- |
| CoO | 3.60 |
| MoO₃ | 15.5 |
| ReO** | 1.8 |
| Al₂O₃ | Balance |

**ReO designates rare earth oxides of the lanthanum series.

EXAMPLE 3

This catalyst was a cobalt molybdate catalyst supported on alumina spheres.

| Constituent | % |
| --- | --- |
| CoO | 4.5 |
| MoO₃ | 15.0 |
| Al₂O₃ | Balance |

The surface area of this catalyst, measured by nitrogen absorption, was 130 m²/g for the new catalyst and 74 m²/g for the used catalyst.

EXAMPLE 4

The spheres of Example 3 were impregnated by immersion into an aqueous solution of potassium carbonate. The catalyst was immersed and dried and immersed and dried until a concentration of 12 percent K₂CO₃ was obtained. The catalyst was then calcined at a temperature of 800° F. This catalyst had an initial surface area measured by nitrogen absorption of 74 m²/g and a surface area in the used state of 70 m²/g.

EXAMPLE 5

This preparation has magnesium aluminate spinel as the support. Magnesium aluminate spinel has both chemical and physical properties which are unique and which result in a support having high thermal resistance to the catalyst applied to the support migrating into the support interstitially.

The magnesium aluminate support was prepared by mixing 28.3 parts MgO, 63.7 parts alpha alumina (10–15 m²/g surface area) and 8.0 parts alumina (acid reactive Boehmite type) with a nitric acid solution. After drying, granulating, and blending with a lubricant, the particles were compressed into tablets 3/16″ in diameter and ⅛″ in height. The tablets were then dried and calcined at 1600° F. and incorporated into a catalyst via solution impregnation and calcination for a nominal composition of 4% CoO and 16% MoO$_3$. The analyzed product contained:

| Constituent | % |
|---|---|
| CoO | 3.87 |
| MoO$_3$ | 14.6 |
| MgAl$_2$O$_4$ | Balance |

The surface area of the new product, measured by nitrogen absorption, was 7.8 m$^2$/g and the surface area of the used product was 7.2 m$^2$/g.

EXAMPLE 6

The catalyst prepared in accordance with Example 5 in the form of ⅛×3/16″ tablets were immersed in a solution of potassium carbonate and dried and reimmersed and dried for a sufficient time that the finished tablets contained 4 percent by weight of potassium carbonate K$_2$CO$_3$. These catalysts were then calcined at 800° F. These tablets had a nominal composition:

| Constituent | % |
|---|---|
| CoO | 3.87 |
| MoO$_3$ | 14.6 |
| K$_2$CO$_3$ | 4 |
| MgAl$_2$O$_4$ | Balance |

EXAMPLE 7

The catalyst tablets prepared according to Example 5 were immersed into a solution of manganese nitrate. The immersed tablets were thereafter dried and calcined at 1600° F. for sufficient time to convert the manganese nitrate over to manganese dioxide (MnO$_2$). These catalysts contained on analysis:

| Constituent | % |
|---|---|
| CoO | 3.71 |
| MoO$_3$ | 16.0 |
| MnO$_2$ | .5 |

The surface area was not run on the new catalyst but the used catalyst had a surface area as measured by nitrogen absorption of 3.4 m$^2$/g.

EXAMPLE 8

Catalyst tablets prepared in accordance with Example 5 were immersed into a solution of potassium carbonate and dried and reimmersed and dried until 4 percent by weight of potassium carbonate was added to the catalyst by impregnation. This catalyst was then calcined at 800° F. The calcined catalyst was then immersed into an aqueous solution of manganese nitrate and the manganese nitrate impregnated catalyst was recalcined at 800° F. to convert the manganese nitrate to manganese dioxide.

Due to the fact that the manganese nitrate solution is acidic, the catalyst was impregnated by exact solution dipping. Multiple dips, therefore, are avoided to prevent dissolution of the K$_2$CO$_3$. The surface area of the catalyst after use, as measured by nitrogen absorption, was 6.6 m$^2$g. While surface area measurements were not run on the new catalyst, they were run on some other preparations of the same components and were in the range of 6.1 to 7.8 in the new state, again, as measured by nitrogen absorption.

EXAMPLE 9

The catalyst spheres prepared according to Example 4 were immersed by exact dipping into a solution of manganese nitrate so as to incorporate 1% by weight manganese dioxide (expressed as the oxide) onto the catalyst. The catalyst was thereafter dried and calcined at 800° F. to convert the nitrate to the oxide. This catalyst had a surface area in the new state as measured by nitrogen absorption of 175 m$^2$/g and in the used state of 140 m$^2$/g. The composition was as follows:

| Constituent | % |
|---|---|
| CoO | 3.80 |
| MoO$_3$ | 14.77 |
| K$_2$CO$_3$ | 11.11 |
| MnO$_2$ | 0.82 |
| Al$_2$O$_3$ | Balance |

X-ray diffraction measurement of the used catalyst showed both gamma and alpha phases of alumina.

EXAMPLE 10

Another catalyst was prepared by the same method as described in Example 8, except that the potassium carbonate concentration was increased from 4 percent to 10 percent. The manganese dioxide concentration remained the same. The composition of the new catalyst was as follows:

| Constituent | % |
|---|---|
| CoO$_3$ | 3.24 |
| MoO$_3$ | 17.5 |
| K$_2$CO$_3$ | 7.81 |
| MnO$_2$ | .23 |
| MgAl$_2$O$_4$ | Balance |

EXAMPLE 11

The catalyst of this example was again prepared in the same manner as Example 10 except that the manganese dioxide concentration was increased from 1 percent to 2 percent. The composition of the new catalyst by analysis was:

| Constituent | % |
|---|---|
| CoO | 2.15 |
| MoO$_3$ | 16.5 |
| K$_2$CO$_3$ | 7.91 |
| MnO$_2$ | 1.53 |
| MgAl$_2$O$_4$ | Balance |

EXAMPLE 12

This catalyst was prepared in the same method of Example 9 except that the potassium carbonate concentration was decreased to 10 percent and the manganese dioxide increased to 2 percent. The nominal composition of this catalyst was:

| Constituent | % |
|---|---|
| CoO | 4.0 |

| Constituent | % |
| --- | --- |
| MoO$_3$ | 16.0 |
| K$_2$CO$_3$ | 10.0 |
| MnO$_2$ | 2.0 |
| Al$_2$O$_3$ | Balance |

EXAMPLE 13

This catalyst was prepared by the same method as Example 12 except that the potassium carbonate concentration was reduced to 4 percent and the manganese dioxide remained at the 2 percent level.

EXAMPLE 14

The catalyst support in this case was magnesium aluminate, prepared in the method described in Example 5 except that the MgAl$_2$O$_4$ carrier was calcined at 1200° F. rather than 1600° F. The calcined tablets were then immersed into a cobalt-molybdenum ammine solution and dried. This procedure was repeated a sufficient number of times so that the cobalt oxide concentration was about 4 percent and the molybdenum oxide concentration was about 16 percent. Thereafter, the catalyst was dried and calcined and after cooling was then immersed into a potassium carbonate solution and dried to impregnate onto the catalyst 10 percent by weight of potassium carbonate. This catalyst was then calcined and cooled and manganese nitrate impreganted thereon by exact dipping to obtain 1 percent MnO$_2$. The catalyst was again calcined to convert the manganese nitrate to the oxide at a concentration of about 1 percent. The surface area of the new catalyst, as measured by nitrogen absorption, was 69 m$^2$/g, whereas the surface area of the used catalyst was in the neighborhood of 7 m$^2$/g. The nominal composition was as follows:

| Constituent | % |
| --- | --- |
| CoO | 4.0 |
| MoO$_3$ | 16.0 |
| K$_2$CO$_3$ | 10.0 |
| MnO$_2$ | 1.0 |
| MgAl$_2$O$_4$ | Balance |

EXAMPLE 15

This catalyst was prepared identically to that of Example 14, except for omission of the final impregnation of the catalyst in the manganese nitrate solution. As a consequence, the catalyst contained no manganese dioxide but was otherwise identical. The surface area of the new catalyst was 65.0 m$^2$/g and the used catalyst was 4.3 m$^2$/g.

EXAMPLE 16

The catalyst of this example was prepared by the same method as that of catalyst 12 except that only 1 percent of manganese dioxide was impregnated onto the catalyst rather than 2 percent. The surface area of the new catalyst was 190 m$^2$/g and surface area of the used catalyst was 107 m$^2$/g.

| Constituent | % |
| --- | --- |
| CoO | 4.0 |
| MoO$_3$ | 16.0 |
| K$_2$CO$_3$ | 10.0 |
| MnO$_2$ | 1.0 |
| Al$_2$O$_3$ | Balance |

All the alumina in the new catalyst was in the gamma phase. The alumina of the used catalyst was found to be in both the alpha phases and the gamma phase.

EXAMPLE 17

The catalyst of Example 2 was immersed into a solution of potassium carbonate and calcined a sufficient number of times to impregnate 10 percent by weight of potassium carbonate thereon. This catalyst was then immersed only once into a manganese nitrate solution to add 1.0 percent of manganese dioxide to the finished catalyst by exact dipping. During calcination at a temperature of 800° F., the manganese nitrate was converted to manganese dioxide.

| Constituent | % |
| --- | --- |
| CoO | 4.0 |
| MoO$_3$ | 16.0 |
| ReO | 6.3 |
| K$_2$CO$_3$ | 10.0 |
| MnO$_2$ | 1.0 |
| Al$_2$O$_3$ | Balance |

EXAMPLE 18

Alumina tablets, consisting of gamma alumina in the form of ⅛×3/16" tablets, were immersed into a cobalt-molybdenum ammine solution of such concentration to add about 4.0 percent cobalt oxide and 16 percent molybdenum oxide to the catalyst. Upon calcination, the metal salts were converted over to metal oxides. Thereafter, the calcined catalyst was immersed in a potassium carbonate solution. The catalyst then containing 10 percent by weight of potassium carbonate was calcined at 800° F. and the calcined and cooled catalyst was then immersed once in a manganese nitrate solution so that 1 percent by weight of manganese expressed as the oxide was added by exact dipping. This catalyst was again calcined at 800° F. The physical properties of the finished catalyst showed that the new catalyst had a surface area of 124 m$^2$/g as measured by nitrogen absorption whereas the finished catalyst had a surface area of 24 m$^2$/g. X-ray diffraction measurements of the new catalyst showed that the alumina existed both in the gamma and the alpha phases.

| Constituent | % |
| --- | --- |
| CoO | 4.0 |
| MoO$_3$ | 16.0 |
| K$_2$CO$_3$ | 10.0 |
| MnO$_2$ | 1.0 |
| Al$_2$O$_3$ | Balance |

EXAMPLE 19

The catalyst prepared in accordance with Example 2 was immersed in a solution of potassium carbonate. This procedure was continued with intermittent drying steps until the potassium carbonate concentration reached 10 percent. Thereafter, the catalyst was calcined at 800° F. The calcined and cooled catalyst was then immersed into a manganese nitrate solution to impregnate onto the catalyst 1 percent by weight expressed as the oxide of manganese and the catalyst was then calcined at 800° F. as previously described. The surface area of this catalyst was 122 m²/g in the new state. The catalyst contained gamma alumina.

| Constituent | % |
|---|---|
| CoO | 4.0 |
| $MoO_3$ | 16.0 |
| ReO | 6.0 |
| $K_2CO_3$ | 10.0 |
| $MnO_2$ | 1.0 |
| $Al_2O_3$ | Balance |

EXAMPLE 20

This catalyst was prepared identically to the method of 16. The finished catalyst contained the following:

| Constituent | % |
|---|---|
| CoO | 4.0 |
| $MoO_3$ | 16.0 |
| $K_2CO_3$ | 10.0 |
| $MnO_2$ | 1.0 |
| $Al_2O_3$ | Balance |

The surface area of the new catalyst was 86 m²/g and of the used catalyst, 45 m²/g. X-ray diffraction indicated that the alumina existed in the alpha phase in both the new and used catalyst. In the used catalyst, the Å size of the alumina was about 2000. The used catalyst also contained molybdenum sulfide ($MoS_2$), having an Å size of 164.

TESTING PROCEDURE

The activity test results on the sour gas shift catalysts are given in Tables I and II. The conditions of the tests are shown therein. Thus, in Table I, the dry gas space velocity was 4500 vol/vol-hr. As is known, gas space velocity relates to the velocity of gas under standard conditions per volume of catalyst per hour.

In Table I, the doubly promoted potassium carbonate/manganese oxide catalyst shown in Example 9 was chosen as the standard. Thus, it was assigned a relative activity of 100 and all the other catalysts were measured in relation to this catalyst.

The steam-to-gas ratio, the pressure and the catalyst volume are all shown on the Table.

At each temperature tested, i.e., 450° F., 550° F. and 650° F., there is indicated the approach-to-equilibrium in degrees Fahrenheit at that operating temperature. Approach-to-equilibrium is defined as the number of degrees required above the operating temperature at which the outlet composition would be at thermodynamic equilibrium. Thus, since lower temperatures favor the desired reaction of carbon monoxide and steam to $CO_2$ and hydrogen, the lower the approach-to-equilibrium figure, the higher the activity that can be accorded to the catalyst.

TABLE I

Referring now to Table I, it will be seen that under standard conditions operating at 450°, catalyst 9, which is the cobalt oxide-molybdenum oxide on alumina promoted with 12 percent potassium carbonate and 1 percent manganese oxide, had a relative activity of 100 in the sulfided state while the same composition of cobalt, molybdenum on the magnesium aluminate spinel catalyst had a relative activity of 101. The potassium concentration of catalyst 8 was only 4% as compared to 12%. However, at 550°, the relative activity of catalyst 8 was 128, versus 100 for the standard catalyst. At 650° the relative activity was 135 to 100. Further, at 650° F., catalyst 8 was operating at equilibrium.

The catalyst of Example 7 had the same composition as the catalyst of Example 8 except for the omission of potassium carbonate. This catalyst (Example 7) had a relative activity of only 21 at 450° F., 25 at 550° F., and 24 at 650° F. Thus, the addition of manganese dioxide to the standard cobalt molybdenum catalyst supported on the magnesium aluminate spinel without the alkali metal component promoter had no appreciable promotional effect on the catalyst.

TABLE I

| ACTIVITY TEST RESULTS ON SOUR GAS SHIFT CATALYSTS | | | | | | | | | | | | |
|---|---|---|---|---|---|---|---|---|---|---|---|---|
| Conditions: | Dry Gas Space Velocity | = 4500 | | | Inlet Gas Composition: | | % CO | = 6.0 | | | | |
| | Steam/Gas Ratio | = 1:1 | | | | | % $CO_2$ | = 32.0 | | | | |
| | Pressure (psig) | = 412 | | | | | % $N_2$ | = 2.0 | | | | |
| | Catalyst Vol. (cc) | = 15 | | | | | % $H_2S$ | = 0.25 | | | | |
| | | | | | | | % $H_2$ | = Balance | | | | |

| | | | 1 | 2 | 3 | 4 | 5 | 6 | 7 | 8 | 9 |
|---|---|---|---|---|---|---|---|---|---|---|---|
| | EXAMPLE | | | | | | | | | | |
| | CoO | | | | | | | | | | |
| | $MoO_3$ | | | | | | | | | | |
| | $K_2CO_3$ | | | | | | | | | | |
| | $MnO_2$ | | | | | | | | | | |
| | Temp. °F. | | | | | | | | | | |
| CHEMICAL | 650 | % CO Inlet | 5.95 | 5.95 | 5.34 | 4.75 | 5.56 | 4.77 | 5.50 | 5.50 | 5.77 |
| COMPOSITION | | % CO Exit | 1.98 | 2.29 | 2.05 | 1.44 | 2.68 | 1.50 | 2.30 | 1.23 | 1.16 |
| (by percentage) | | Approach (°F.) | 98.00 | 127.00 | 102.00 | 32.00 | 155.00 | 44.00 | 110.00 | 0 | 2.00 |
| | | Relative Activity* | 32.00 | 26.20 | 27.70 | 47.30 | 19.20 | 42.50 | 24.10 | 135.00 | 100.00 |
| | 550 | % CO Inlet | 5.86 | 5.86 | 5.51 | 4.81 | 5.74 | 4.85 | 5.50 | 5.50 | 5.89 |
| | | % CO Exit | 1.62 | 3.17 | 2.51 | 0.66 | 3.32 | 1.06 | 2.53 | 0.68 | 77.00 |
| | | Approach (°F.) | 209.00 | 285.00 | 248.00 | 16.00 | 297.00 | 84.00 | 229.00 | 8.00 | 25.00 |
| | | Relative Activity* | 86.80 | 19.30 | 27.00 | 114.00 | 17.40 | 61.90 | 25.00 | 128.00 | 100.00 |
| | 450 | % CO Inlet | 5.59 | 5.59 | 5.57 | 5.52 | 5.88 | 4.82 | 5.50 | 5.50 | 5.89 |

TABLE I-continued

ACTIVITY TEST RESULTS ON SOUR GAS SHIFT CATALYSTS

Conditions: Dry Gas Space Velocity = 4500  Inlet Gas Composition: % CO = 6.0
Steam/Gas Ratio = 1:1  % CO$_2$ = 32.0
Pressure (psig) = 412  % N$_2$ = 2.0
Catalyst Vol. (cc) = 15  % H$_2$S = 0.25
% H$_2$ = Balance

| | | 1 | 2 | 3 | 4 | 5 | 6 | 7 | 8 | 9 |
|---|---|---|---|---|---|---|---|---|---|---|
| | % CO Exit | 1.30 | 4.06 | 3.91 | 0.68 | 3.77 | 1.33 | 2.64 | 0.39 | 0.40 |
| | Approach (°F.) | 147.00 | 443.00 | 443.00 | 108.00 | 425.00 | 212.00 | 344.00 | 47.00 | 39.00 |
| | Relative Activity* | 23.20 | 9.10 | 10.10 | 65.60 | 12.80 | 38.00 | 21.40 | 101.00 | 100.00 |
| CoO | Nominal | | | 4.50 | | | 3.87 | | | |
| | New | 2.99 | 3.60 | 4.00 | 4.45 | 3.87 | — | 3.71 | 3.37 | 3.80 |
| | Used | 2.93 | 2.66 | 3.83 | 3.75 | 3.07 | — | — | — | 3.18 |
| MoO$_3$ | Nominal | | | 15.00 | | | 14.60 | | | |
| | New | 10.90 | 15.50 | 13.10 | 14.43 | 14.66 | — | 16.00 | 16.01 | 14.77 |
| | Used | 9.30 | 12.00 | 14.30 | 16.10 | 12.20 | — | — | — | 11.93 |
| K$_2$CO$_3$ | Nominal | 0 | 0 | 0 | 12.00 | 0 | 4.00 | 0 | 4.00 | 12.00 |
| | New | | | | 13.69 | 0 | — | | 4.57 | 11.11 |
| | Used | | | | 11.58 | 0 | 5.89 | | | 7.43 |
| MnO$_2$ | Nominal | | | | | | | 1.00 | 1.00 | 1.00 |
| | New | | | | 0 | | | 0.50 | 0.50 | 0.82 |
| | Used | | | | 0 | | | | | 0.69 |
| Rare Earth Oxides | Nominal | | 6.30 | | | | | | | |
| Al$_2$O$_3$ | | | Bal. | Bal. | | | | | | Bal. |
| MgAl$_2$O$_4$ | | | | | Bal. | Bal. | | | | |
| Surface Area (m$^2$/g) | New | 160.00 | 188.00 | 130.00 | 74.00 | 7.80 | | | | 175.00 |
| | Used | 131.00 | 59.00 | 74.00 | 70.00 | 7.20 | | 3.40 | 6.60 | 140.00 |
| X-ray Diffraction | New | MgAl$_2$O$_4$ + MgO | αAl$_2$O$_3$ | αAl$_2$O$_3$ | αAl$_2$O$_3$ | αAl$_2$O$_3$ | αAl$_2$O$_3$ | | | |
| | Used | — | αAl$_2$O$_3$ | αAl$_2$O$_3$ | αAl$_2$O$_3$ | | αAl$_2$O$_3$ | | | γAl$_2$O$_3$ αAl$_2$O$_3$ 50/50 |

Referring to Example 6, in which this catalyst has the same composition as Example 8, but without the manganese oxide, the relative activity of the catalyst of Example 6 was only 38 at 450° F., 17 at 550° F., and 19 at 650° F.

This catalyst, in other words, had slightly less activity than the commercial catalyst, of Example 2, which was also unpromoted. The beneficial effect of potassium carbonate is clearly shown in the Example 4 in which 12 percent potassium carbonate showed a 65 relative activity at 450° F. and a 47 percent relative activity at 650° F. Nevertheless, even though the beneficial effect of the spinel carriers and the beneficial effects of the potassium carbonate promoters are clearly demonstrated, the beneficial effect of the double promotion is 1 to 2 times that of the individual constituents.

TABLE II

Referring now to Table II, the space velocity of the activity test was increased from 4500 to 6750 vol/vol-hr. Otherwise, the conditions remained identical. Thus, for example, in Examples 10 and 11, in which the identical composition was maintained on the magnesium aluminate carrier, the addition of an additional 1 percent MnO$_2$ in Example 11 to raise that constituent from 1 percent to 2 percent did not increase the activity, and, in fact, decreased it slightly. The relative activity of Example 10, as can be seen at 450° F. was 56.8, whereas the activity of Example 11 was 46.6. The same catalyst containing 2 percent manganese dioxide and 10 percent potassium carbonate in Example 12 had an activity of 48.9. Reducing the potassium carbonate from 10 percent to 4 percent, in Example 13, however, reduced the relative activity down to 16.6.

That catalyst of Example 14, however, showed an extremely good relative activity of 99.4.

TABLE II
ACTIVITY TEST RESULTS ON SOUR GAS SHIFT CATALYSTS

Conditions:
- Dry Gas Space Velocity = 6750
- Steam/Gas Ratio = 1:1
- Pressure (psig) = 412
- Catalyst Vol. (cc) = 15

Inlet Gas Composition:
- % CO = 6.0
- % $CO_2$ = 32.0
- % $N_2$ = 2.0
- % $H_2S$ = 0.25
- % $H_2$ = Balance

| Catalyst | | 10 | 11 | 12 | 13 | 14 | 15 | 16 | 17 | 18 | 19 | 20 |
|---|---|---|---|---|---|---|---|---|---|---|---|---|
| Temp. °F. | | | | | | | | | | | | |
| 650 | % CO Inlet | | | | | | | 5.57 | 5.57 | 6.21 | 6.14 | 6.14 |
| | % CO Exit | | | | | | | 1.99 | 2.31 | 1.25 | 1.33 | 1.21 |
| | Approach (°F.) | | | | | | | 112.00 | 142.00 | 9.00 | 11.00 | 2.00 |
| | Relative Activity* | | | | | | | 30.50 | 24.70 | 77.70 | 70.00 | 100.00 |
| 550 | % CO Inlet | | | | | | | 5.53 | — | 5.84 | 7.14 | 6.92 |
| | % CO Exit | | | | | | | 1.77 | — | 0.75 | 0.99 | 0.81 |
| | Approach (°F.) | | | | | | | 161.00 | — | 27.00 | 69.00 | 40.00 |
| | Relative Activity* | | | | | | | 40.60 | — | 110.00 | 81.50 | 100.00 |
| 450 | % CO Inlet | 5.52 | 6.52 | 6.06 | 6.06 | 6.08 | 6.08 | 5.45 | 5.45 | 5.84 | 6.92 | 6.92 |
| | % CO Exit | 1.24 | 1.66 | 1.49 | 3.65 | 0.53 | 0.93 | 0.83 | 1.33 | 0.68 | 0.85 | 0.67 |
| | Approach (°F.) | 186.00 | 236.00 | 220.00 | 404.00 | 74.00 | 147.00 | 139.00 | 209.00 | 88.00 | 159.00 | 124.00 |
| | Relative Activity* | 56.80 | 45.60 | 48.90 | 16.60 | 99.40 | 69.50 | 72.50 | 51.70 | 80.70 | 86.40 | 100.00 |
| CHEMICAL COMPOSITION (by percentage) | | | | | | | | | | | | |
| CoO | Nominal | 4.00 | | 4.00 | 4.00 | 4.00 | 4.00 | 4.00 | 4.00 | 4.00 | 4.00 | 4.00 |
| | New | 3.24 | 2.15 | 3.81 | 4.06 | 1.02 | 1.77 | 3.75 | 3.03 | 2.76 | 4.79 | 3.03 |
| | Used | 2.93 | 2.03 | — | — | 1.51 | 0.63 | 3.51 | 2.99 | 2.77 | — | 3.60 |
| $MoO_3$ | Nominal | 17.50 | 16.50 | 16.00 | 16.00 | 16.00 | 16.00 | 16.00 | 16.00 | 16.00 | 16.00 | 16.00 |
| | New | 16.40 | 17.20 | 15.98 | 16.56 | 12.73 | 16.35 | 19.07 | 16.01 | 11.46 | 18.29 | 12.43 |
| | Used | 10.00 | 10.00 | 10.00 | — | 9.94 | 10.30 | 12.13 | 10.38 | 11.84 | — | 14.38 |
| $K_2CO_3$ | Nominal | 7.81 | 7.91 | 9.30 | 4.00 | 10.00 | 10.00 | 10.00 | 10.00 | 10.00 | 10.00 | 10.00 |
| | New | 6.13 | 7.09 | — | 4.09 | 12.28 | 11.75 | 11.70 | 12.68 | 14.81 | 9.81 | 12.29 |
| | Used | 1.00 | 2.00 | 2.00 | — | 9.29 | 9.90 | 3.90 | 4.43 | 0.61 | — | 2.99 |
| $MnO_2$ | Nominal | 0.23 | 1.53 | 1.40 | 2.00 | 1.00 | — | 1.00 | 1.00 | 1.00 | 1.00 | 1.00 |
| | New | 0.19 | 1.32 | — | 1.61 | — | — | 0.67 | 0.99 | 1.00 | — | 0.71 |
| | Used | | | | | 0.61 | | 0.67 | 1.07 | 1.05 | 0.94 | 0.83 |
| Rare Earth Oxides | Nominal | | | | | | | | 6.30 | 0.81 | — | |
| $Al_2O_3$ | | Bal. | Bal. | | | | | | Bal. | Bal. | | Bal. |
| $MgAl_2O_4$ | | | | | | | | | | | | |
| Surface Area ($m^2/g$) | New | 109.00 | 122.00 | 62.00 | 144.00 | 69.00 | 65.00 | 190.00 | 161.00 | 124.00 | 122.00 | 86.00 |
| | Used | | 109.00 | | | 7.00 | 4.30 | 107.00 | 128.00 | 24.00 | — | 45.00 |
| X-ray Diffraction | New | $\alpha Al_2O_3$ | $\alpha Al_2O_3$ | $\alpha Al_2O_3$ | $\alpha Al_2O_3$ | $\gamma Al_2O_3$ | $\gamma Al_2O_3$ | $\gamma Al_2O_3$ | $\gamma Al_2O_3$ | $\gamma Al_2O_3$ | $\gamma Al_2O_3$ | $\alpha Al_2O_3$ |
| | Used | $\alpha Al_2O_3$ | $\alpha Al_2O_3$ | | | $\gamma Al_2O_3$ | $\gamma Al_2O_3$ | $\alpha Al_2O_3$ $\gamma$ 50/50 | $\alpha Al_2O_3$ $\gamma$ 60/40 | $\alpha Al_2O_3$ | | $\alpha Al_2O_3$ |

This catalyst was supported on the magnesium aluminate spinel, but was calcined at 1200° F. rather than 1600° F. as had been the case with Examples 10 and 11. Omitting the manganese oxide constituent in Example 15 resulted in an activity of 69.5 as compared to 99.4 for Example 14.

Referring now to Examples 19 and 20, both of these preparations contained essentially the same composition on alumina and each had high relative activities. The relative activity of Example 19 was 86.4 and 100 for the catalyst of Example 20. (Reference standard for Table II).

The addition of potassium compounds has a promotional effect upon the sulfactive metal oxide catalyst. Supporting the sulfactive oxides on specific carriers, as for example, magnesium aluminate spinels, zinc aluminate spinels, and alumina also appears to enhance the activity of the catalyst. The sulfactive metal oxide components comprise cobalt oxide, cobalt sulfide, nickel sulfide, nickel oxide, in combination with an oxide of a transition element of groups V through VII and sulfides of the transition elements of groups V through VII of the periodic system of elements. This invention, however, shows that the addition of a metal oxide of a fourth period metal such as manganese dioxide, to these known components in relatively small percentages produces a synergistic effect with the potassium promoter upon the catalytic activity. We have found that the activity of the doubly-promoted catalyst is 1.5 to 2.0 fold that of the singly-promoted catalysts containing potassium carbonate or manganese dioxide alone.

It is felt, therefore, that we have provided to the art a double-promoted catalyst for the conversion of carbon monoxide with steam to carbon dioxide and hydrogen in sour gas and a catalyst having unexpectedly high activity at low temperatures. The examples given herein were meant to be exemplary in nature and nonlimiting except so as to be commensurate in scope with the appended claims.

We claim:
1. Sulfactive CO conversion catalyst, which comprises:
   A. an aluminous catalyst carrier;
   B. catalytically active metal compounds including the oxides and sulfides of cobalt and molybdenum;
   C. a promotional amount of an alkali metal compound;
   D. a promotional amount of an oxide or a sulfide of manganese.
2. A catalyst, as defined in claim 1, in which said aluminous carrier includes from 5 percent to 95 percent of a magnesium aluminate spinel or a zinc aluminate spinel.
3. A catalyst, as defined in claim 1, in which said aluminous carrier consists essentially of aluminum oxide.
4. A catalyst, as defined in claim 1, in which said aluminous carrier contains aluminum oxide primarily in the gamma phase.
5. A catalyst, as defined in claim 1, in which said aluminous carrier contains aluminum oxide primarily in the alpha phase.
6. A catalyst, as defined in claim 1, in which said catalyst carrier contains aluminum oxide, in the gamma phase and which is stabilized with a stabilizing amount of a rare earth oxide.
7. A catalyst, as defined in claim 1, in which said oxide or sulfide of cobalt is present in a weight concentration of about 2% to 10%.
8. A catalyst, as defined in claim 1, in which said molybdenum oxide or sulfide is present in a weight concentration of about 5% to 20%.
9. A catalyst, as defined in claim 1, in which said alkali metal compound consists of potassium carbonate.
10. A catalyst, as defined in claim 1, in which said oxide or sulfide of manganese is present in a concentration of from about 0.1 percent to 5 percent by weight.

* * * * *

UNITED STATES PATENT OFFICE
CERTIFICATE OF CORRECTION

Patent No. 4,389,335      Dated June 21, 1983

Inventor(s) Jay S. Merriam; Cecil B. Hogg

It is certified that error appears in the above-identified patent and that said Letters Patent are hereby corrected as shown below:

Title Page [56] under References Cited
- 4,153,580 -      "Hauberger" should read --Hausberger--
Col. 3, lines 8 & 9 the phrase "a small amount of an oxide of" should be deleted.

Signed and Sealed this

Eighth Day of November 1983

|SEAL|

*Attest:*

GERALD J. MOSSINGHOFF

*Attesting Officer*      *Commissioner of Patents and Trademarks*

UNITED STATES PATENT AND TRADEMARK OFFICE
CERTIFICATE OF CORRECTION

PATENT NO. : 4,389,335

DATED : June 21, 1983

INVENTOR(S) : Jay S. Merriam and Cecil B. Hogg

It is certified that error appears in the above-identified patent and that said Letters Patent is hereby corrected as shown below:

Column 4, line 16, the word --weight-- should appear before "loss".

Column 4, line 61, the word --prevent-- should appear before "the catalyst" and the word --from-- should appear before "migrating".

Column 9, line 32, "Å" should read --crystallite--.

Column 9, line 33, the symbol --Å-- should appear after "2000".

Column 9, line 34, the word and symbol "an Å" should read --a crystallite--.

Column 9, line 35, the symbol --Å-- should appear after "164".

Column 10, line 28, the numeral --8-- should appear before "had".

Column 10, line 30, the phrase --for catalyst 9-- should appear after "12%".

Column 11, line 43, the numeral "17" should read --62--.

Column 11, line 43, "19" should read --43--.

Column 11, line 44, the phrase "slightly less" should read --more--.

Column 11, line 45, the word "commercial" should be stricken

Column 11, line 46, the word "also" should be stricken.

Table I, under Column 1, second line from the bottom, "86.80" should read --46.80--.

Table I, under Column 9, fourth line from the bottom, "77.00" should read --0.77--.

UNITED STATES PATENT AND TRADEMARK OFFICE
CERTIFICATE OF CORRECTION

PATENT NO. : 4,389,335
DATED : June 21, 1983
INVENTOR(S) : Jay S. Merriam and Cecil B. Hogg It is certified that error appears in the above-identified patent and that said Letters Patent is hereby corrected as shown below:

Column 15, line 33, "double" should read --doubly--.

Signed and Sealed this

Fourth Day of June 1985

[SEAL]

Attest:

DONALD J. QUIGG

Attesting Officer     Acting Commissioner of Patents and Trademarks